United States Patent [19]

Yoda

[11] Patent Number: 5,038,213
[45] Date of Patent: Aug. 6, 1991

[54] ELECTRONIC STILL CAMERA

[75] Inventor: Masaharu Yoda, Tokyo, Japan

[73] Assignee: Kyocera Corporation, Kyoto, Japan

[21] Appl. No.: 541,611

[22] Filed: Jun. 21, 1990

[30] Foreign Application Priority Data

Feb. 16, 1990 [JP] Japan .................................. 2-33695
Feb. 19, 1990 [JP] Japan .................................. 2-36363

[51] Int. Cl.⁵ .......................................... H04N 3/14
[52] U.S. Cl. ................................. 358/209; 358/909
[58] Field of Search ............... 358/229, 909, 906, 209

[56] References Cited

U.S. PATENT DOCUMENTS

| | | | |
|---|---|---|---|
| 4,742,369 | 5/1988 | Ishii et al. | 358/909 |
| 4,823,199 | 4/1989 | Sakakibara et al. | 358/909 |
| 4,855,837 | 8/1989 | Tanimoto | 358/909 |
| 4,937,673 | 6/1990 | Saito | 358/909 |
| 4,953,029 | 8/1990 | Morimoto et al. | 358/909 |

Primary Examiner—Stephen Brinich
Attorney, Agent, or Firm—Spensley Horn Jubas & Lubitz

[57] ABSTRACT

Here is disclosed an electronic still camera adapted to record a video information on an information recording medium such as video floppy disc, card memory or the like.

This electronic still camera comprises an assembly of a box-like configuration with its height larger than its width, the assembly including a lens unit located in a front area within the camera and a memory drive unit and a battery unit located in a rear area within the camera, wherein the respective units and components are assembled together around the lens unit serving as a supporting base.

9 Claims, 8 Drawing Sheets

ELECTRONIC STILL CAMERA

BACKGROUND OF THE INVENTION 1. (Field of the Invention)

The present invention relates to an electronic still camera adapted to record video information on a magnetic information recording medium contained therein such as video floppy disc, card memory or the like.

2. (Background Art)

The electronic still camera of prior art basically comprises a photoelectric converter element (referred to hereinafter as CCD) located behind, for example, a single focus lens, a viewfinder unit located laterally adjacent them, a video floppy disc drive (referred to hereinafter as VFDD) located laterally adjacent said viewfinder unit so as to receive a video floppy disc as horizontally orientated, a flash discharger unit used for flash photographing located laterally adjacent said VFDD, a signal processor substrate located under said VFDD, and a battery located behind said VFDD.

The video floppy disc is inserted into and withdrawn out from the VFDD through an insertion opening of so-called kangaroo pocket type provided in a top wall of the camera or of so-called slot type provided in a rear wall of the camera.

When such electronic still camera is viewed from the front, the camera presents a flat and wide configuration having the single focus lens on the left hand and the flash discharger unit on the right hand (first embodiment of prior art).

Another electronic still camera of prior art basically comprises the CCD located behind the single focus lens, the VFDD located lateral adjacent them so as to receive the video floppy disc as vertically orientated, the battery located on the side opposed to said VFDD, the signal processor substrate located behind said VFDD, and the viewfinder unit and the flash discharger unit both located above said battery.

The video floppy disc is inserted into and withdrawn out from the VFDD through the insertion opening of so-called kangaroo pocket type provided in the rear wall of the camera or of so-called slot type provided in the lateral or top wall of the camera.

When such electronic still camera is viewed from the front, the camera presents a configuration similar to that of so-called 35 mm compact camera utilizing conventional silver halide film, having the single focus lens at the center and the viewfinder unit and the flash cube of the flash discharger unit on the right hand adjacent the top (second embodiment of prior art).

Of the conventional electronic still camera, the first embodiment has a configuration similar to that of the disc camera and the second embodiment has a configuration similar to that of the 35 mm compact camera, so the user might often, by force of habit, rotate the camera by 90° as if using the classic camera in photographing, for example, a person being standing with a result that, upon playing back of the photographed object, a 90° rotated image appears.

As an example of multifunction cameras, there is sometimes offered the electronic still camera adopting a zoom lens for telescopic/wide angle photographing. If such camera is of the flat type as has been mentioned above as the first embodiment of prior art, the lens diameter would be substantially larger than a height of the camera casing and a weight distribution of the camera would be uncontrollably one-sided. This makes it difficult to hold the camera with single hand and to sling up the camera in a well balanced condition. Thus, such camera would be inconvenient for use from the viewpoints of maneuverability and portability.

If such multifunction electronic still camera is of the 35 mm compact camera type as has been mentioned above as the second embodiment of prior art, the zoom lens would extensively protrude forward from a portion of the camera casing and this would also give rise to problems with respect to maneuverability and portability.

With the electronic still camera of prior art, the units such as the lens unit, the VFDD and the viewfinder unit as well as the components such as the CCD, the battery box and the signal processor substrate are assembled together using the camera frame as supporting base. Such construction utilizing the camera frame as the supporting base necessarily makes it difficult to achieve an efficient grouping of the components into relatively few units and restricts selective positioning of the respective units and components because locations and spaces to be occupied by these units and components are rigidly determined by the camera frame. Consequently, a space efficiency for loading of these units and components is seriously prevented from being improved to minimize a size of the camera.

The electronic still cameras of well known art including the above-mentioned embodiments of prior art commonly present a camera configuration which is one-sided either in vertical direction or in horizontal direction due to the locations occupied by the VFDD and the battery. This makes it difficult to hold the camera in a stabilized condition during photographing. Furthermore, vertically or horizontally asymmetric configuration of the camera is undesirable also from the aesthetic viewpoint.

SUMMARY OF THE INVENTION

A first object of the invention is to develop an electronic still camera adapted to avoid a manner of photographing which results in 90° rotated image when played back.

A second object of the invention is to improve the space efficiency for loading of the respective units and components and thereby to make the camera as compact as possible.

A third object of the invention is to improve a hold characteristic by positioning the respective units and components so as to bias a weight distribution of the camera to a portion of the camera to be grasped by the hand.

A fourth object of the invention is to improve an aesthetic value of the camera by achieving a symmetry both in vertical direction and in horizontal direction.

A fifth object of the invention is to develop an electronic still camera improved with respect to both the space efficiency for loading and the manufacturing efficiency by allowing the respective units and components to be loaded without use of the camera frame as the supporting base, functionally grouping the components as many as possible into respective units and improving a degree of freedom for arrangement of the respective units and components.

The first through fourth objects as set forth above are achieved, in accordance with the invention, by an electronic still camera comprising an assembly of a box-like configuration with its height larger than its width, said assembly including a lens unit located in a front area so as to have a photoelectric converter element behind it, a viewfinder unit of TTL type located in a rear area adjacent a top of the camera, an information recording unit located under said viewfinder unit so as to receive a plate-like information recording medium therein and a battery box adapted to contain a battery both located under said viewfinder unit.

The fifth object as set forth above is achieved, according to the invention, by an electronic still camera comprising an assembly of a box-like configuration with its depth larger than its width, said assembly including respective units and components essential to the electronic still camera such as a lens unit, a viewfinder unit, an information recording unit, a battery box, a photoelectric converter element and a signal processor substrate separately prepared and assembled together around the lens unit serving as a supporting base and a camera cover enclosing this assembly.

BRIEF DESCRIPTION OF THE DRAWING

FIGS. 1 through 4 illustrate a first embodiment of the invention, in which:

FIGS. 5 through 9 illustrate a second embodiment of the invention, in which:

DESCRIPTION OF THE PREFERRED EMBODIMENTS

The first embodiment will be described in reference with the accompanying drawings.

Figure 1:
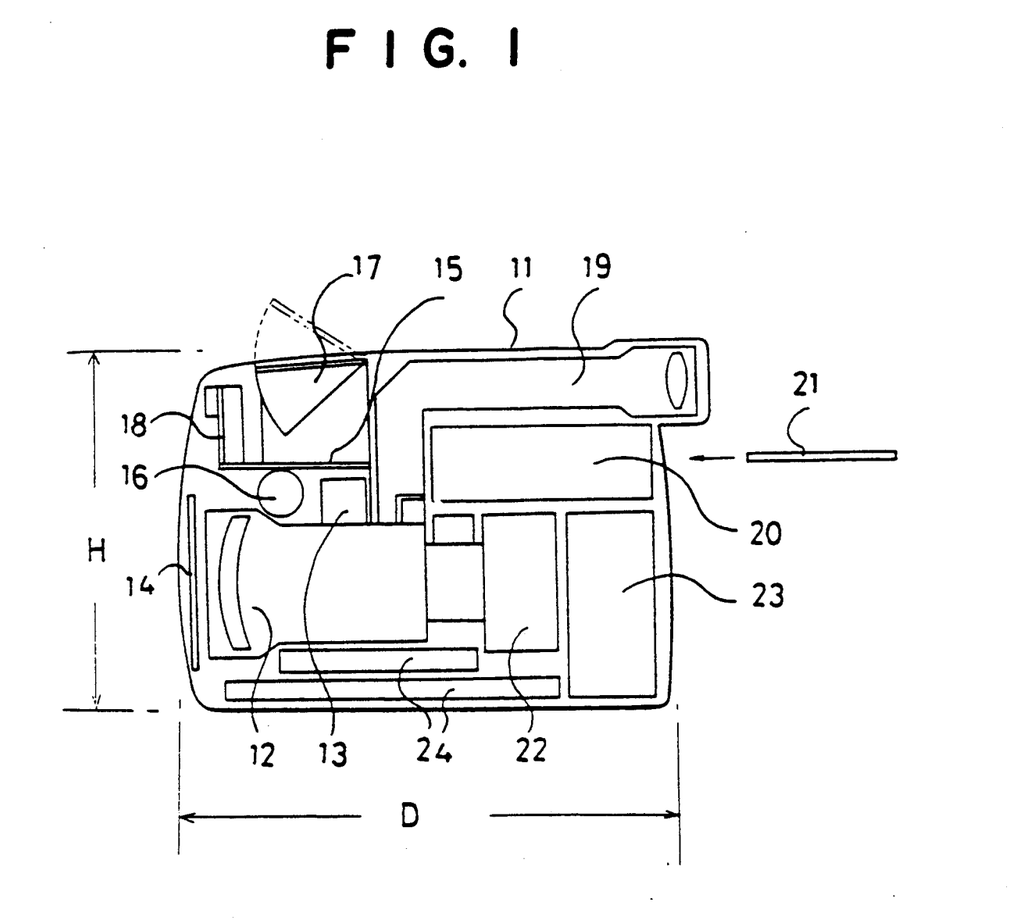
FIG. 1 is a schematic sectional side view of an electronic still camera, showing a basic construction of the invention.

FIG. 1 is a schematic sectional side view of the electronic still camera, showing a basic construction of the invention.

Referring to FIG. 1, a camera casing 11 is configured so as to form a flattened box having a height H larger than a width L (extending perpendicularly to the figure plane) and a depth D larger than the height H. Thus, a camera configuration is provided in the form of so-called upright camera.

In a front area within the camera casing 11, a zoom lens unit 12 having a longitudinal optical axis is located near the casing bottom, said lens unit 12 being provided with an electromotor 13 serving as a drive for zooming and focusing, and a lens barrier 14 is provided immediately in front of said lens unit 12. An upper space of said front area contains components such as a circuit substrate 15, a capacitor 16, a flash discharger unit including a flash tube 17, and a circuit substrate 18 exclusively for white balancing.

With this embodiment, a source switch may be activated to swing the flash cube 17 out as indicated by two-dot-chain lines and, in operative association with the flash tube 17, to clear the lens barrier 14 from the front of the lens.

In a rear area within the camera casing 11, a viewfinder unit 19 including elements such as a viewfinder optical system and an eyepiece is located in an upper space of said rear area The viewfinder unit 19 is of TTL type by which light rays of an object to be photographed are guided through the zoom lens 12 so that the object can be viewed through the eyepiece disposed in the rear wall of the camera casing 11 at an upper location A VFDD 20 is located immediately under said viewfinder unit 19 so that a video floppy disc 21 can be inserted into and withdrawn out from the camera casing 11 through an insertion opening extending through the rear wall thereof. The VFDD 20 allows, as will be appreciated, the video floppy disc 21 to be horizontally laid (with opposite surfaces thereof facing up- and downward, respectively) for information recording.

It should be understood that said VFDD 20 will be replaced by any other information recording unit when the information recording medium other than the video floppy disc 21 such as a card memory is used.

Below said VFDD 20, a CCD 22 is located behind the zoom lens unit 12 and a battery box 23 is located behind said CCD 22. The battery box 23 is adapted to contain a battery loaded thereinto through an opening formed in the rear wall of the camera casing 22, which is normally closed by an openable lid.

A plate-like member on the bottom within the camera casing 11 is a signal processor substrate 24. The electronic still camera further comprises a release button and zooming means provided on the rear side of the camera casing 11 at an upper area.

Figure 2:
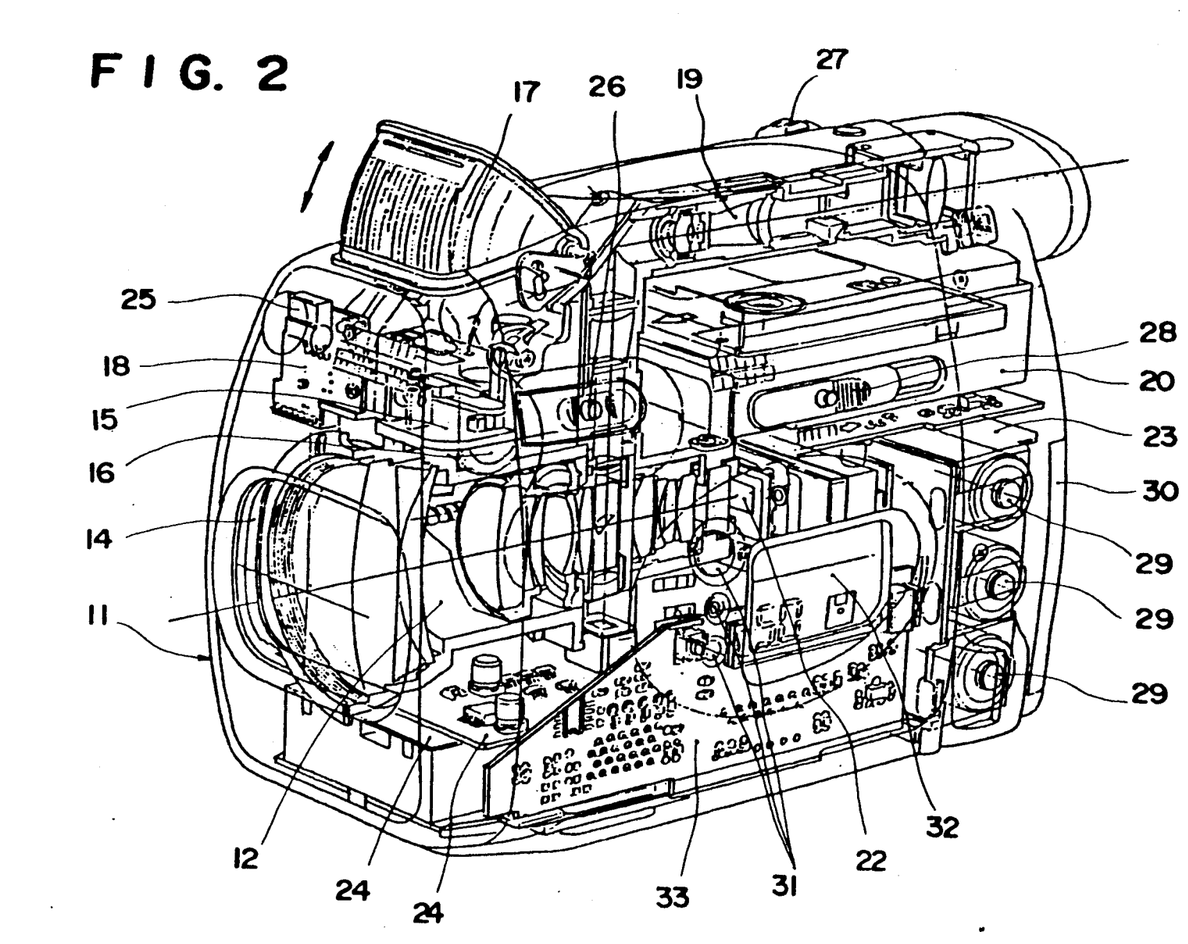
FIG. 2 is a perspective view, partially broken away, showing said electronic still camera actually loaded with various units and components.

FIG. 2 is a perspective view, partially broken away, showing said electronic still camera actually loaded with the above-mentioned units and components.

Referring to FIG. 2, reference numeral 25 designates a photoreceptor for white balancing, reference numeral 27 designates zooming means (through not shown, the release button is provided adjacent the zooming means 27), reference numeral 28 designates an ejector button for the video floppy disc 21, reference numeral 29 designates the battery, reference numeral 30 designates the openable lid for the battery box 23, reference numeral 31 designates setting means for photographing modes and the like, and reference numeral 32 designates a display for count of photographed frames, photographing modes and the like. It should be understood that, actually, there are provided signal processor substates 33 also on both sides of the zoom lens unit 12.

Figure 3A:
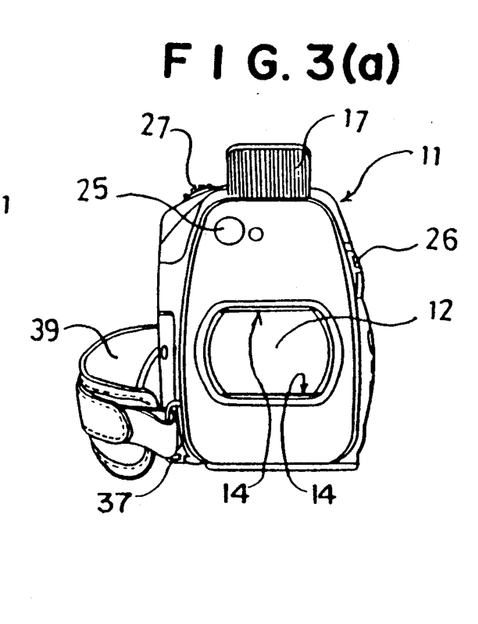
FIG. 3 shows an outer configuration of said electronic still camera in a front view (FIG. 3a), in a left side view (FIG. 3b), in a rear view (FIG. 3c) and in a plan view (FIG. 3d)
Figure 3B:
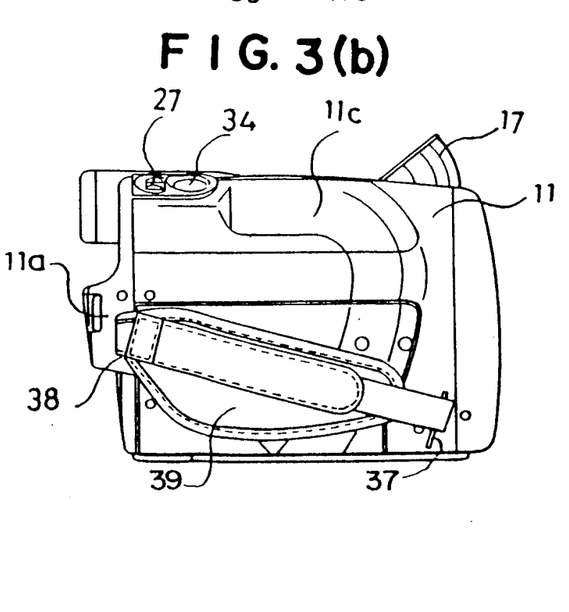
Figure 3C:
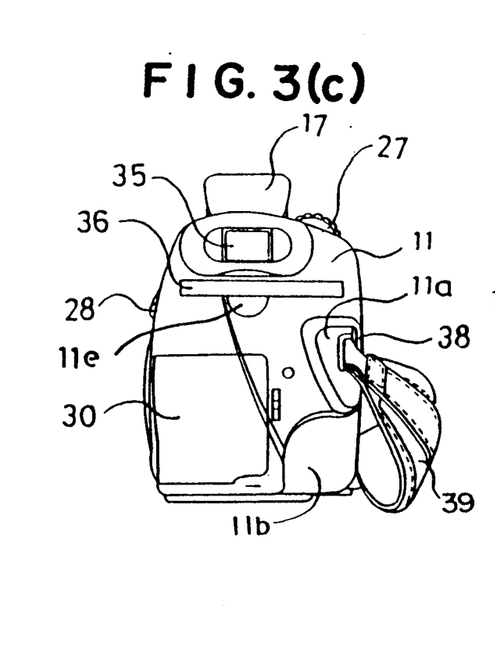
Figure 3D:
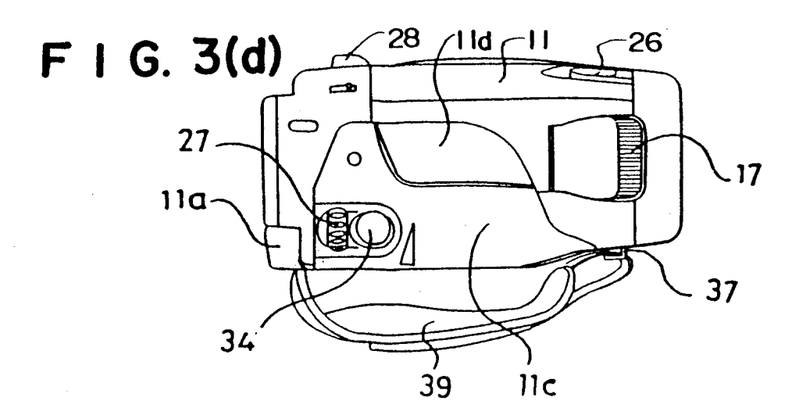

FIG. 3 shows an outer configuration of the above-mentioned electronic still camera in a front view (FIG. 3a), in a left side view (FIG. 3b), in a rear view (FIG. 3c) and in a plan view (FIG. 3d).

As shown by FIG. 3, there are provided the release button 34 closely adjacent the zooming means 27, an insertion opening 36 for the video floppy disc 21 formed through the rear wall of the camera immediately below a window of the viewfinder, a projection 11a formed also on the rear wall to the right substantially at a middle level so that the user's thumb bears against this projection, and a recess 11b under said projection 11a so that the ball of the thumb fits into this recess 11b.

With this camera, as seen in FIG. 3, a strap 39 is attached at one end to anchoring means 37 provided on the left side wall of the camera casing at a position adjacent the front and the bottom and at the opposite end to anchoring means 38 on the same side wall but adjacent the rear side substantially at a middle level. The left side wall thus opposed to said strap 39 is formed with a relatively shallow recess 11c and the top wall is formed with a similar recess 11d so that the user's fingers other than the thumb conveniently fit into these recesses when the camera is held. Furthermore, the rear wall of the camera is formed with a semicircular recess 11e being continuous to the insertion opening 36 and thumb's tip will bear against this recess 11e.

Figure 4A:
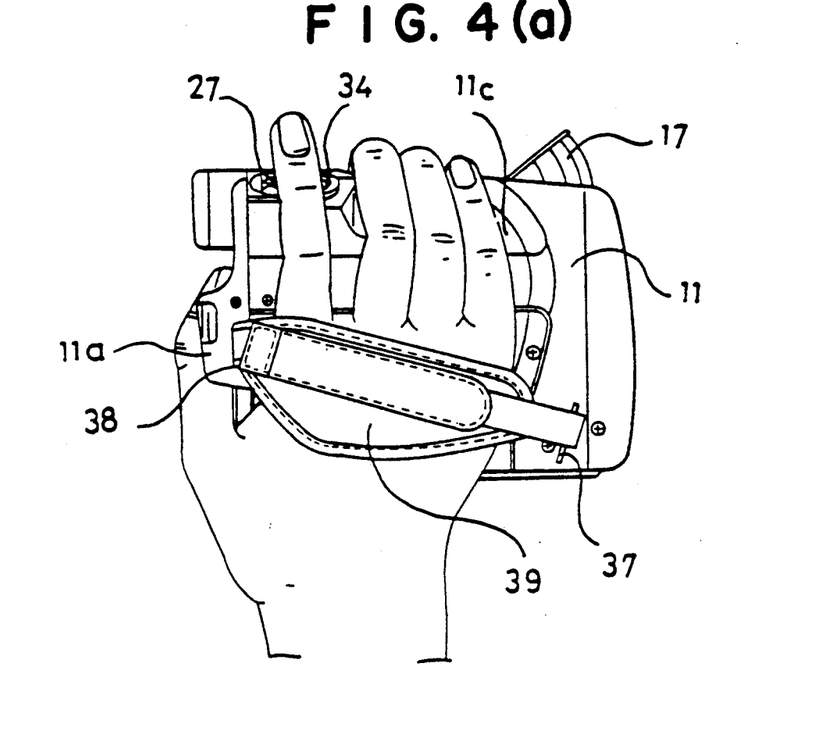
FIG. 4a illustrates said electronic still camera as being held by a hand.

FIG. 4a illustrates said electronic still camera as being held. As seen in FIG. 4a, the user's right hand is inserted between the camera and the strap 39 with the palm place under the rear half of the camera bottom, the thumb placed on the camera back and the other fingers bearing against the recesses 11c, 11d on the camera left side.

With the camera held in such manner, the thumb bears against the projection 11a and the ball of the thumb fits into the recess 11b of the camera back, so the camera is additionally held between the ball of the thumb and the roots of the fingers other than the thumb. Thus the camera is held by the user's hand as if it is integral with the user's hand.

In this manner, the camera is reliably supported by the user's hand substantially at the gravity center thereof, significantly stabilizing the camera hold.

With the camera being held in such a manner, the tip of the user's index finger is above the release button 34 as well as the zooming means 27 and ready to activate them.

Figure 4B:
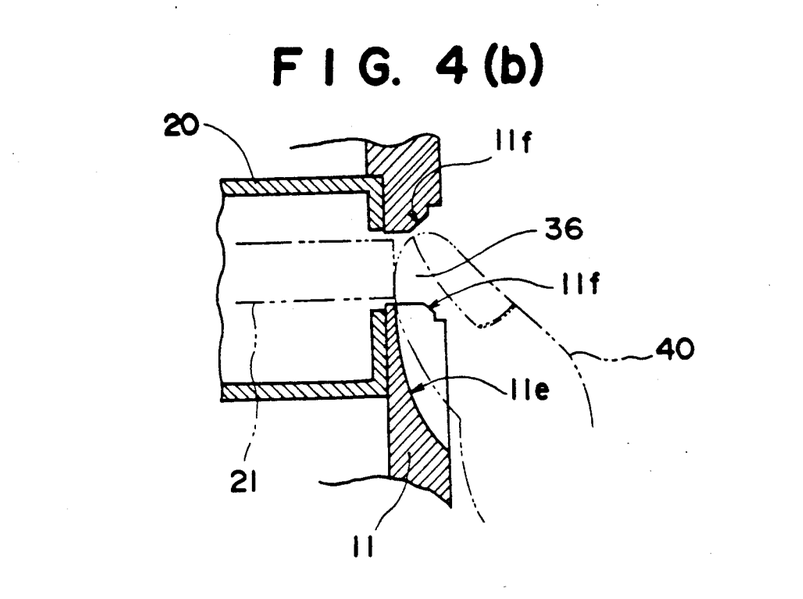
FIG. 4b is an enlarged sectional view of an insertion opening for a floppy disc.

Additionally, the tip of the thumb fits into the recess 11e and thereby a fitness with which the camera can be held is further improved. As will be understood from FIG. 4b that the thumb 40 fitting into the recess 11e can be utilized to force the floppy disc 21 into the VFDD 20. The insertion opening 36 is tapered 11f along its edge so that the floppy disc 21 can be smoothly guided into the VFDD 20.

As seen in FIG. 3, the invention improves the camera of this type also in the aesthetic aspect by configuring the front and rear sides vertically oblong and the lateral sides horizontally oblong.

As will be appreciated from the foregoing description, the electronic still camera of the invention is advantageous over the prior art in that a possibility of careless 90° rotation in photographing can be avoided since the camera is configured as the upright camera, in the form of a flattened box, adapted to be held at its rear lower portion; and the camera hold is stabilized due to the arrangement such that the lens unit is loaded within the space available in the front area while the viewfinder unit, the information recording unit, the battery box and the other components which contribute to increased weight are loaded within the space available in the rear area of the camera casing and the lower portion of this rear area is to be held in photographing; and the space efficiency for loading of the respective units and components is improved so as to facilitate miniaturization of the camera.

It should be understood that the VFDD 20 and the battery box 23 in the embodiment as has been described above may be replaced with each other; the VFDD 20 may be placed above or behind the CCD 22 while the battery box 23 may be placed under the zoom lens unit 12 or the CCD 22; or the battery box 23 may be placed above or behind the CCD 22 while the VFDD 20 may be placed under the zoom lens unit 12 or the CCD 22. Alternatively, the battery box 23 may be placed under the zoom lens unit 12 or above the CCD 22 while the VFDD 20 may be placed laterally adjacent the CCD 22.

The video floppy disc 21 may be adapted to be inserted into and withdrawn out from the VFDD 20 vertically or horizontally, depending on placement and orientation of said VFDD 20.

Now a second embodiment of the invention will be described in reference with the accompanying drawings.

Figure 5:
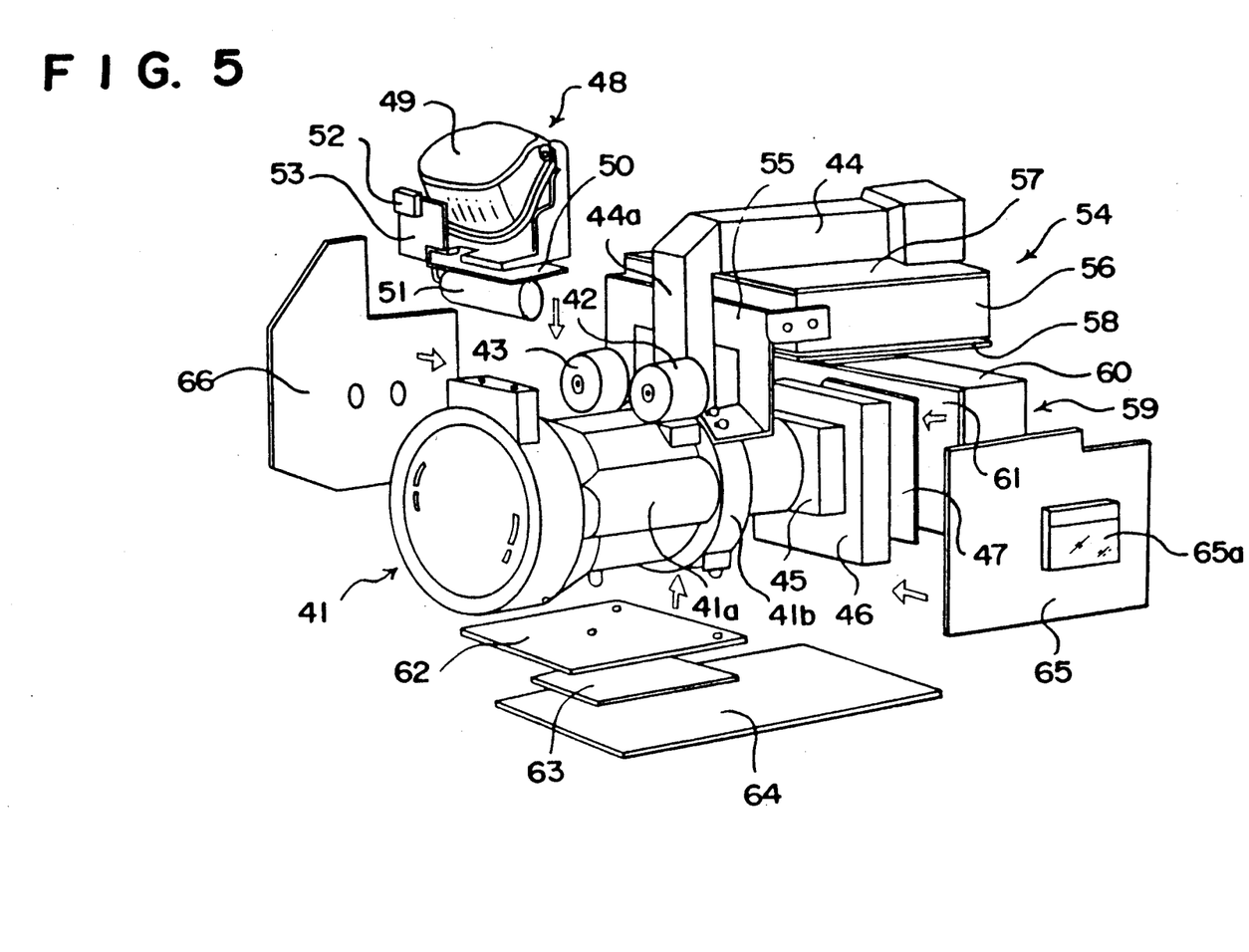
FIG. 5 is an exploded schematic perspective view of various units and components to be loaded into the electronic still camera.

FIG. 5 is a schematic perspective view of various units and components to be loaded into the electronic still camera.

Referring to FIG. 5, reference numeral 41 designates a zoom lens unit including a photographing lens provided within a lens barrel casing 41a adapted to be movable within the casing for zooming and focusing. It should be understood that, although the barrel casing 41a actually comprises the front portion designated by the reference numeral 41a and a collar 41b secured by screws to said front portion 41a as well as to a rear portion so as to connect the front portion 41a integrally with the rear portion, these portions will be described collectively as the barrel casing 41a for convenience of illustration.

In this embodiment, the zoom lens unit 41 is utilized as a supporting base for loading of respective units and components. Specifically, an electromotor 42 for autofocusing and an electromotor 43 for zooming are mounted on a rear top of the barrel casing 41a and a viewfinder unit 44 of TTL type, adapted to guide light rays from an object to be photographed through the photographing lens, is connected to the barrel casing behind said electromotors.

The viewfinder unit 44 is connected to an upright cylindrical portion 44a being integral with the barrel casing 41a and includes a viewing window on the rear side of the camera.

Said zoom lens unit 41 is provided at its rear portion with a CCD 45 serving as a solid state photographing element behind which a camera imager device substrate 46 and a camera timing generator substrate 47 are mounted in this order.

A flash discharger unit 48 is stationarily mounted on said zoom lens unit 41 on upper side of the front end. The flash discharger unit 48 comprises components such as a flash cube 49, a circuit substrate 50 and a capacitor 51 previously assembled into this unit, and other components incorporated integrally with this unit, such as a photoreceptor 52 for white balancing and a circuit substrate 53 exclusively serving this photoreceptor 52.

Immediately under said viewfinder unit 44 there is provided a VFDD unit 54 which is held by a support plate 55 secured to the barrel casing 41a at its rear upper portion. The VFDD unit 54 comprises components previously assembled into this unit, such as a video drive 56 adapted to receive the video floppy disc as horizontally orientated, a video modulator substrate 57 and a video interface substrate 58.

Under said VFDD unit 54 there is located a battery box unit 59 which is secured to a camera cover as will be described later. The battery box unit 59 comprises components integrally assembled thereinto, such a battery box 60 and a circuit substrate 61 for battery.

Additionally, a camera system interface substrate 62, a camera delay circuit substrate 63 and a camera processor substrate 64 are secured to the underside of said barrel casing 41a. Furthermore, a system control circuit substrate 65 and a camera control interface substrate 66 are secured to the lateral sides of said barrel casing 41a, respectively. Said system control circuit substrate 65 caries thereon a display 65a for count of photographed frames, photographing modes and the other data.

Of the various circuit substrates (signal processor substrates) 46, 47, 50, 53, 57, 58, 61, 62, and 63 through 66, respective sets of circuit substrates which must be mutually connected are electrically connected by use of connectors.

Figure 6:
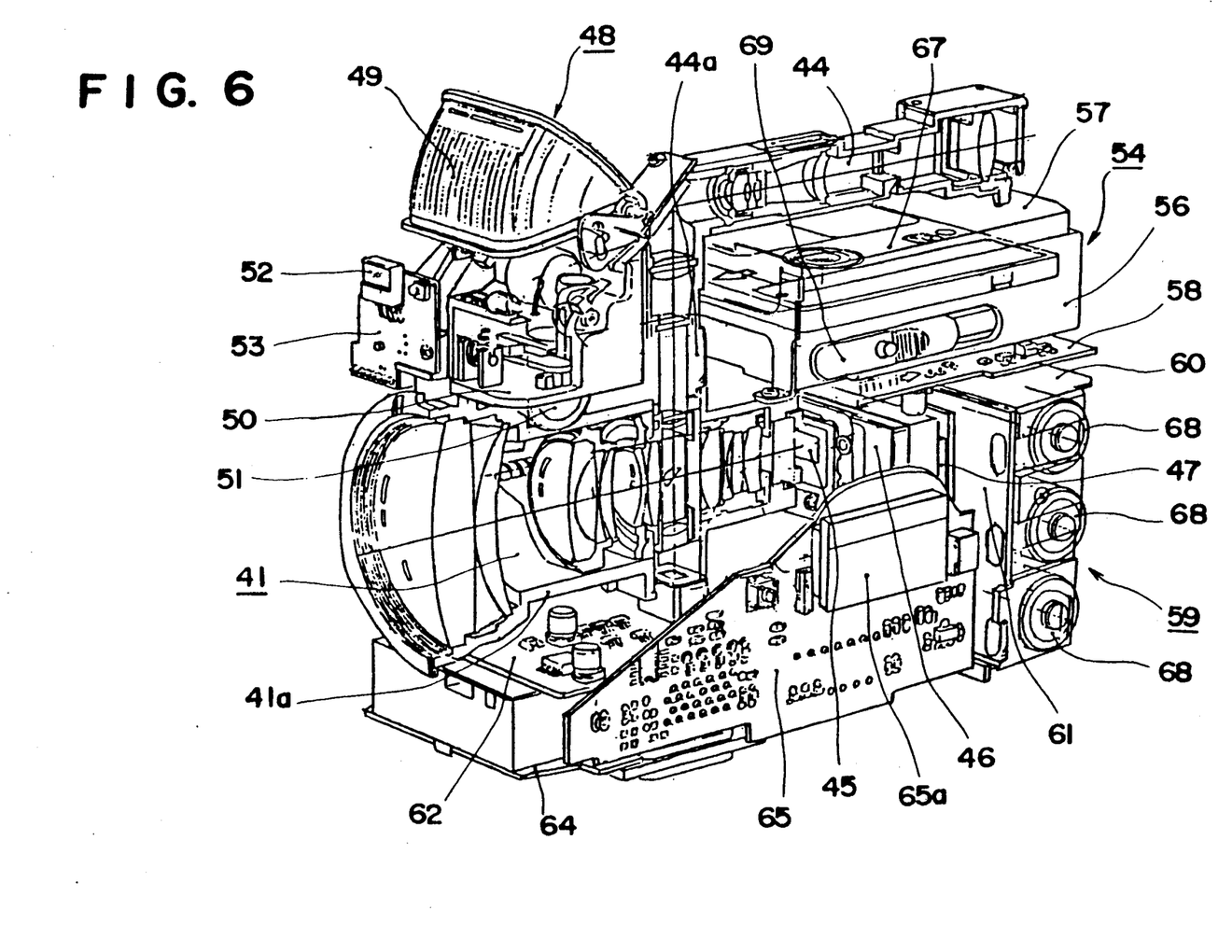
FIG. 6 is a perspective view, partially broken away, showing an inner construction of the camera actually loaded with said various units and components.

FIG. 6 is a perspective view, partially broken away, showing an inner construction of said electronic still camera actually loaded with the respective units and components.

As seen in FIG. 6, this camera is basically constructed so that there is located on the front side the zoom lens unit 41 provided on the upper side with the flash discharger unit 48, on the underside and the lateral sides with the signal processor substrates 62 through 66, and on the rear side with the CCD 45 and the signal processor substrates 46, 47.

On the rear side of the camera, there are located the viewfinder unit 44, the VFDD unit 54 and the battery box unit 59 from the top to the bottom in this order.

Reference numeral 67 designates a video floppy disc contained within the disc drive 56, reference numeral 68 designates a battery contained within the battery box 60, and reference numeral 69 designates an ejector button for the video floppy disc 67.

Figure 7:
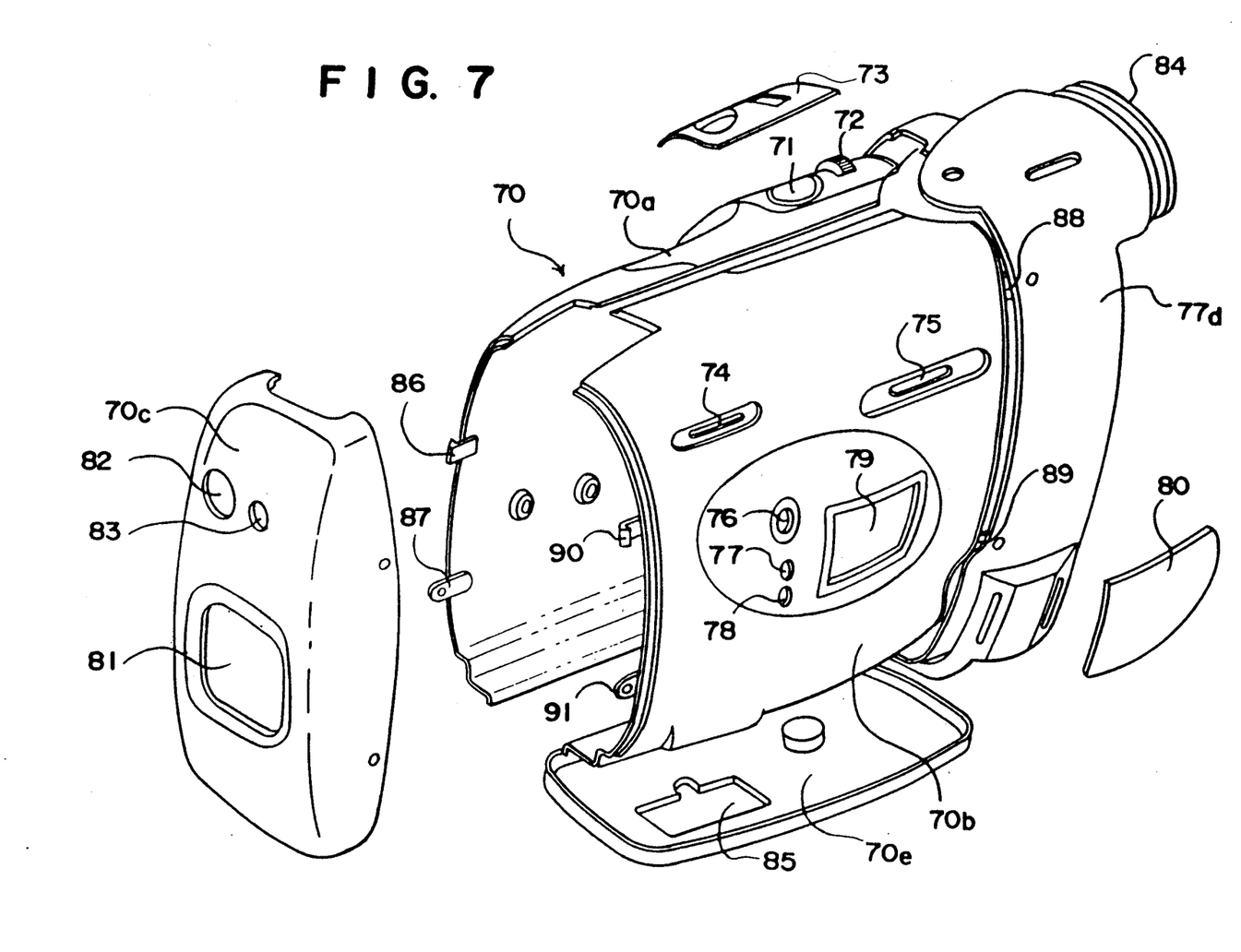
FIG. 7 is a schematic exploded perspective view of a camera cover.

A preassembly of the camera thus loaded with the respective units and components is then enclosed by a camera cover 70 as shown by FIG. 7. This camera cover 70 comprises five sections, i.e., a left cover section 70a, a right cover section 70b, a front cover section 70c, a rear cover section 70d and a bottom cover section 70e. These cover sections are provided with the associated components prior to final assembly.

For example, the left cover section 70a is provided on its rear upper portion with a release button 71, zooming means 72 and a protective plate 73 for said button 71 and said means 72.

The right cover section 70b is formed with a slot 74 in which a main switch is mounted, a slot 75 in which the ejector button 69 is mounted, slots 76, 77, 78 in which a photographing mode changover button, a date setting button and a setting button are respectively mounted, and a window 79 exposing the display, over which a transparent plate 80 is secured.

The front cover section 70c has a window 81 adapted to expose the photographing lens and containing a lens barrier mechanism. This cover section 70c is further formed with openings 82, 83 located in alignment with the photoreceptor 52 for white balancing and a self-timer display, respectively.

The rear cover section 70d is formed with the insertion opening in communication with the disc drive 56, through which the video floppy disc 67 can be inserted into said disc drive 56. This rear cover section 70d is further formed with a cylindrical portion 84 defining a windrow of the viewfinder and being loaded with eyepiece rubber. The rear cover section 70d is still further provided with an openable lid for the battery box 60.

The bottom cover section 70e is provided with an opening 85 for connection of a playback adapter, which is normally closed as by a shutter plate.

The cover sections thus equipped with the respective components are assembled through steps as follow: First, the left cover section 70a is positioned along the left side of the preassembly shown by FIG. 6 and secured by screws to the zoom lens unit 41.

Then, the rear cover section 70d is mounted on the rear side of the preassembly. Specifically, this rear cover section 70d is secured to the left cover section 70a by engaging it with rear tongues (similar to front tongues 86, 87) which extend rearward from the left cover section 70a and threaded screws into these tongues.

Now the right cover section 70b is positioned along the right side of the preassembly and secured to the rear cover section 70d by engaging the rear cover section 70d with rear tongues 88, 89 (similar to front tongues 90, 91) of this right cover section 70b and threading screws into these tongues 88, 89.

The front cover section 70c is secured to the left cover section 70a and the right cover section 70b by engaging it with the front tongues 86, 87 of said left cover section 70a and the front tongues 90, 91 of said right cover section 70b, respectively, and thereafter threading screws into these tongues.

Finally, the bottom cover section 70e is secured by screws to respective lower portions of the left cover sections 70a and the right cover section 70b.

It should be understood that the left cover section 70a, the right cover section 70b, the front cover section 70c and the rear cover section 70d have their joint edges formed complementarily to the associated joint edges, respectively, so that these cover sections may be joined together along a width as narrow as possible.

The complete camera cover 70 assembled in the manner as has been mentioned above has an adequate durability because all the respective cover sections have convex shapes.

Figure 8:
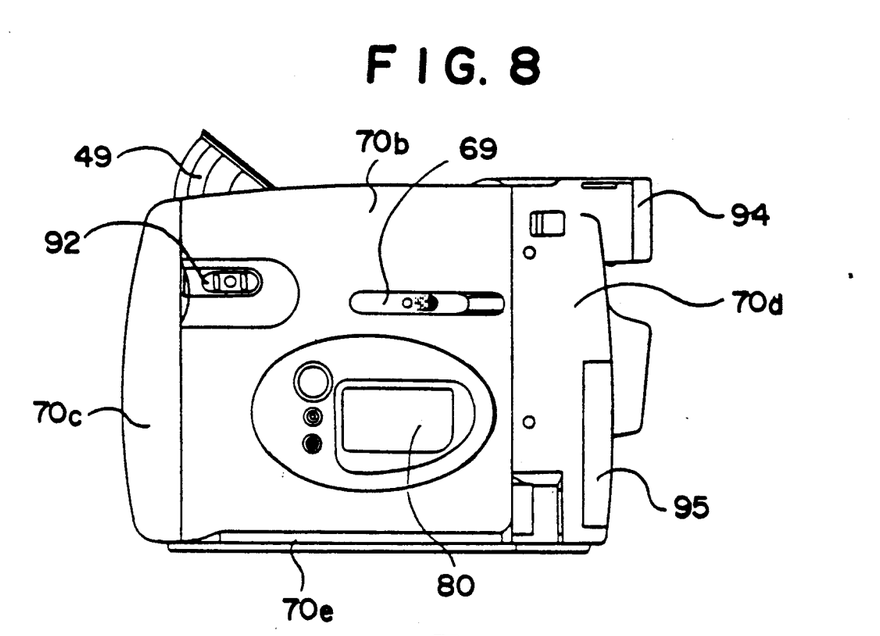
FIGS. 8 and 9 show an outer configuration of said electronic still camera in a side view and in front view, respectively.
Figure 9:
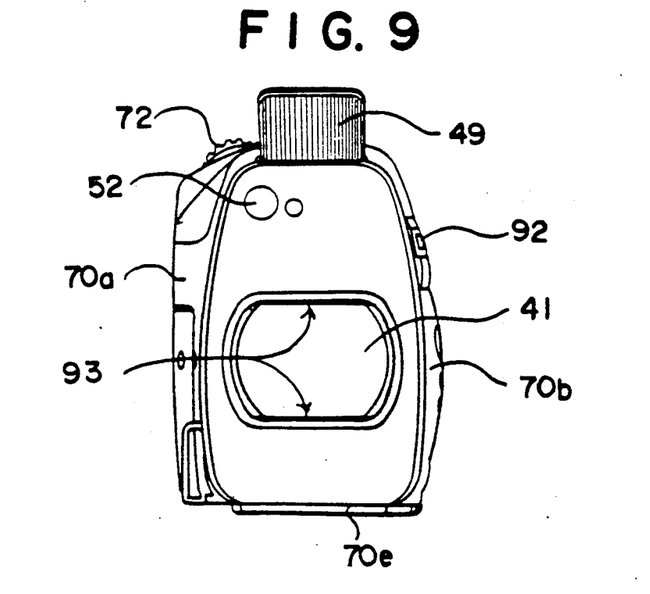

FIGS. 8 and 9 show an outer configuration of the electronic still camera thus assembled in a side view and in a front view, respectively.

As seen in FIGS. 8 and 9, the invention provides so-called upright type electronic still camera which is horizontally oblong as viewed from the side and vertically oblong as viewed from the front.

The electronic still camera of such configuration is advantageous in maneuverability, portability and aesthetic aspect, namely, its well balanced configuration both in vertical direction and in horizontal direction.

Referring to FIGS. 8 and 9, reference numeral 92 designates a main switch button. Upon activation of said main switch button 92, the flash cube 39 protrudes upward and, in operative association with this, the lens barrier 93 is opened to clear the front of the photographing lens. Reference numeral 94 designates an eyepiece rubber and reference numeral 95 designates an openable lid for the battery box 60.

As will be apparent from the foregoing description, with the electronic still camera of the invention, the components can be effectively grouped into units in consideration of functions of the camera as well as positioning of the respective components, because the lens unit serves as the supporting base for the remainder units and components to be assembled together with said lens unit. Consequently, a degree of freedom is improved for loading of the respective units and components and thereby a space efficiency for said loading is correspondingly improved to facilitate miniaturization of the camera.

Grouping of the respective components into units advantageously reduces the number of steps required to achieve a complete assembly of the camera and thus contributes to improvement of the manufacturing efficiency.

In view of the above-mentioned high degree of freedom for loading of the respective units and components into the camera casing, no significant limitation is imposed on the configuration of the camera and thus the invention can provide the electronic still camera which is excellent not only in aesthetic aspect but also in maneuverability and portability.

Although the invention has been described hereinabove in connection with the first and second embodiments, the zoom lens unit 12, 14 may be replaced by a single focus lens unit, and the VFDD unit also may be replaced by any other information recording unit when an information recording medium other than the video floppy disc, for example, a card memory is used.

WHAT IS CLAIMED IS:

1. Electronic still camera comprising an assembly of a box-like configuration with its height larger than its width, said assembly including a lens unit located in a front area within the camera so as to have a photoelectric converter element behind it, a viewfinder unit of TTL type located in a rear area within the camera adjacent a top of the camera, an information recording unit located under said viewfinder unit so as to receive a plate-like information recording medium therein and a battery box adapted to contain a battery both located under said viewfinder unit.

2. Electronic still camera as recited in claim 1, wherein said box-like configuration is defined by a relationship of $L < H < D$ where L represents the width, H represents the height and D represents a depth; and wherein said viewfinder unit of TTL type is located at an upper level, said information recording unit adapted to receive the plate-like information recording medium as horizontally orientated is located at an intermediate level and said battery box adapted to contain the battery is located at a lower level.

3. Electronic still camera as recited in claim 1, further including a lens barrier adapted to selectively open and shut the front of the lens unit, a flash discharger unit having a flash cube adapted to swing out from its home position to a position ready for actual photographing, and a mechanism functioning to open said lens barrier in operative association with said swinging out of said flash cube.

4. Electronic still camera as recited in claim 1, further including camera control means located on an outer surface of the camera at a rear upper position.

5. Electronic still camera as recited in claim 4, further including a projection formed on the rear surface of the camera so that the user's thumb bears against said projection, relatively shallow recesses formed in a lateral side and an upper side of the camera, respectively, and a strap mounted on the lateral side of the camera having said recess so as to oppose said recess.

6. Electronic still camera comprising an assembly of a box-like configuration with its height larger than its width, said assembly including respective units and components essential to the electronic still camera such as a lens unit, a viewfinder unit, an information recording unit, a battery box, a photoelectric converter element and a signal processor substrate separately prepared and assembled together around the lens unit serving as a supporting base and a camera cover enclosing this assembly.

7. Electronic still camera as recited in claim 6, wherein said camera cover comprises a plurality of cover sections adapted to be combined together so as to enclose said assembly.

8. Electronic still camera as recited in claim 6, wherein, when the respective units and components are assembled together around the lens unit serving as the supporting base, the lens unit is located in a front area within the camera so as to have a photoelectric converter element behind it, the viewfinder unit of TTL type is located in a rear area within the camera adjacent a top of the camera, the information recording unit is located under said viewfinder unit so as to receive the plate-like information recording medium therein and the battery box adapted to contain the battery is also located under said viewfinder unit.

9. Electronic still camera as recited in claim 5, further including an insertion opening of horizontal slot type for the plate-like information recording medium formed through the rear wall of the camera and a recess being continuous with said insertion opening so that a tip of the thumb fits into said recess.

* * * * *